Feb. 22, 1955   E. L. TORGERSON   2,702,526
VALVE DEVICE FOR MILKER CLAWS
Filed May 1, 1953
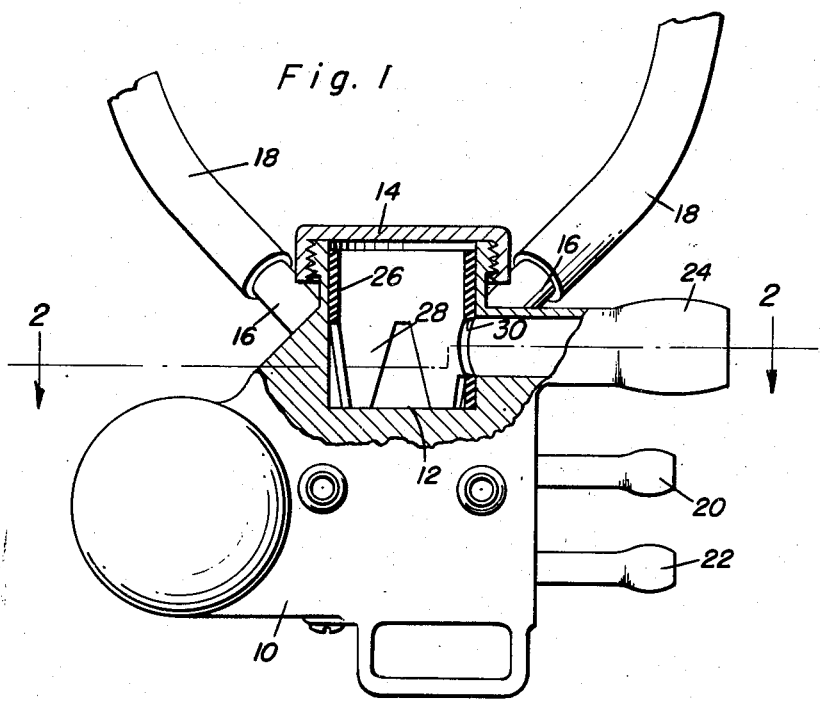
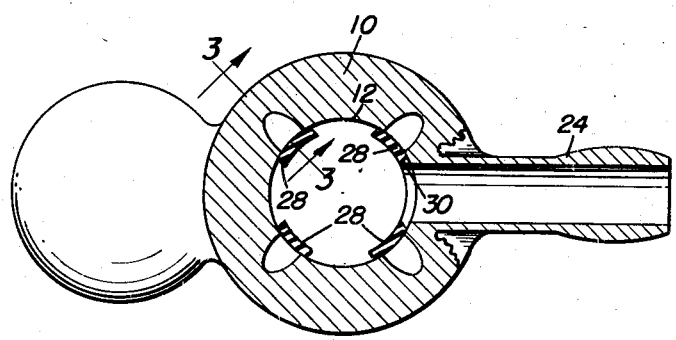
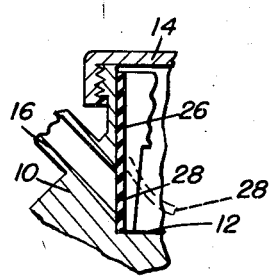
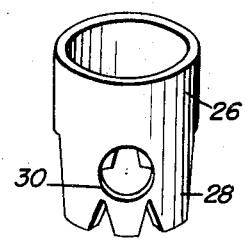
Ernest L. Torgerson
INVENTOR.
BY *Clarence A. O'Brien*
*and Harvey B. Jackson*
Attorneys United States Patent Office 2,702,526
Patented Feb. 22, 1955

2,702,526

VALVE DEVICE FOR MILKER CLAWS

Ernest L. Torgerson, Soldier's Grove, Wis., assignor of twenty per cent to J. J. Hyde, Elkader, Iowa Application May 1, 1953, Serial No. 352,563

3 Claims. (Cl. 119—14.55)

This invention relates to new and useful improvements in milking machines, and the primary object of the present invention is to provide an adapter for milker claws that will reduce considerably the time required for milking a cow.

Another important object of the present invention is to provide a valve means for the claws of milking machines that will prevent milk in the chamber of a claw from being directed upwardly into the tubular arms which are connected to teat cups.

A still further aim of the present invention is to provide a valve means of the aforementioned character that is quickly and readily applied within the chamber of a claw and which may be removed from the claw in a convenient manner for cleaning, repair or the like.

A still further aim of the present invention is to provide a valve means for milker claws that is extremely simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view, partly in section and partly in elevation, of a milker claw and showing the present invention positioned in the chamber of the claw;

Figure 2 is a horizontal sectional view taken substantially on the plane of section line 2—2 of Figure 1;

Figure 3 is an enlarged fragmentary vertical sectional view taken substantially on the plane of section line 3—3 of Figure 2; and Figure 4 is a perspective view of one embodiment of the present invention.

Referring now to the drawings in detail, wherein for the purpose of illustration, there is disclosed a preferred embodiment of the present invention, the numeral 10 represents the claw of a milking machine which includes an upper chamber 12 whose upper open end is closed by a closure 14 threadingly engaged upon the upper threaded portion of the claw 10.

The lower ends of a plurality of circumferentially spaced tubular arms 16 are fixedly secured to or integrally formed with the claw 10. The lower open ends of the arms 16 communicate with the chamber 12 and the upper ends of the arms 16 are frictionally engaged in rubber inflation tubes 18 which are coupled to teat cups (not shown) having shells containing inflation elements.

The claw 10 may be of the single or two-stage pulsating type, that is, of the type wherein all teats will be pulled at once or the type wherein half the teats will be pulled during one phase and the remaining teats pulled during the second phase. The claw illustrated in the drawings is of the two-stage pulsating type since it includes nipples 20 and 22 which are intended to be connected to a source of pressure or a pulsator. Claw 10 is also provided with an outlet nipple 24 that projects outwardly from the chamber 12 to be connected by a hose or the like to a collecting pail so that milk entering chamber 12 through arms 16 may be directed into the collecting pail.

The pulsator which is attached to the nipples 20 and 22 causes the tubes 18 to expand and contract creating the action necessary to pull the milk from the udder. When the pulsator expands the inflation tubes, there is a rush of milk which comes up from the claw to fill the space along with the milk coming out of the teat. Once this space is filled with milk, the action is spent and the milk stops flowing from the teat. As the tubular arms 16 have openings considerably larger than the outlet of the teat, approximately 70% of the milking action is lost.

Therefore, it is the principal object of this invention to provide a device that will reduce milking time for each cow while preventing milk in chamber 12 from passing upwardly into the arms 16. To accomplish this result, there is provided a rubber sleeve 26 that is yieldingly engaged within the chamber 12 upon removal of the closure 14. The lower end of the sleeve 26 is provided with a plurality of circumferentially spaced extensions 28 forming flap valves that rest against the inner periphery of chamber 12 and which extend across the inner ends of arms 16 to close the latter. Sleeve 26 is also provided with an opening 30 which registers with nipple 24 so that milk may enter the nipple 24 from chamber 12.

In the practical use of the present invention, as the suction within the inflation tubes is reduced, the flap valves 28 will be moved to an open position so that tubes 18 may be contracted. As the suction is increased between the inflation tubes and the shell containing the inflation tubes, the flap valves 28 will be yieldingly urged, through their resilient characteristics, against the inner periphery of the chamber 12 to again close the open ends of the tubes 18, thereby preventing milk in the chamber 12 from being urged upwardly into arms 16.

Since numerous modifications will readily occur to those skilled in the art after a consideration of the foregoing specification and accompanying drawings, it is not intended to limit the invention to the precise embodiment shown and described, but all suitable modifications and equivalents may readily be resorted to by those skilled in the art which fall within the scope of the appended claims.

What is claimed as new is as follows:

1. In a milking machine including a claw having an upper chamber and a plurality of tubular arms extending outwardly from the claw and having lower ends communicating with the chamber, and a resilient sleeve received in said chamber and having a plurality of circumferentially spaced valve forming extensions at one end that extend over the lower ends of said arms.

2. In a milking machine including a claw having an upper chamber and a plurality of tubular arms extending outwardly from the claw and having lower ends communicating with the chamber, and a resilient sleeve received in said chamber and having a plurality of circumferentially spaced valve forming extensions at one end that extend over the lower ends of said arms, said resilient sleeve yieldingly engaging the inner periphery of said chamber above the lower ends of said arms.

3. In a milking machine including a claw having an upper chamber, a removable closure at the upper end of said chamber and a plurality of outwardly extending tubular arms attached at their lower ends to the claw and communicating with said chamber, a resilient cylindrical sleeve valve removably positioned in said chamber and removable from the chamber when the closure is disengaged from the chamber, said valve closing the inner ends of said arms and preventing milk from passing into the arms from the chamber, said valve being closed as suction is created between the inflation elements and the shells containing the same.

References Cited in the file of this patent

UNITED STATES PATENTS

| | | |
|---|---|---|
| 1,300,857 | Nicoll | Apr. 15, 1919 |
| 2,329,396 | Dinesen | Sept. 14, 1943 |

FOREIGN PATENTS

| | | |
|---|---|---|
| 122,913 | Sweden | Aug. 5, 1948 |